Patented Feb. 13, 1951

2,541,155

UNITED STATES PATENT OFFICE 2,541,155

POLYMERIZATION OF UNSATURATED ALCOHOLS

Hans Dannenberg, Berkeley Highlands, and David E. Adelson, Berkeley, Calif., assignors to Shell Development Company, San Francisco, Calif., a corporation of Delaware No Drawing. Application October 31, 1947, Serial No. 783,440

2 Claims. (Cl. 260—91.3)

This invention relates to a process for polymerization of a class of unsaturated alcohols and to the novel product obtainable thereby. More particularly, the invention pertains to a method for effecting oxy polymerization of a beta,gamma-monoolefinic monohydric primary alcohol of not more than four carbon atoms, the gamma carbon atom thereof being the carbon atom of a terminal methylene group.

Molecular oxygen and peroxide compounds are known to be powerful agents for effecting the oxidation of organic compounds. It would be expected consequently that treatment of alcohols with such substances would affect the carbinol group thereof and lead to oxidized derivatives of the alcohols. Moreover, it has long been recognized that conjugated systems of double bonds are conducive to formation of polymers from organic compounds. While some special types of compounds which are devoid of conjugated systems like vinyl chloride and vinyl acetate are known to polymerize, these are exceptional cases. It was therefore unexpected and surprising when we discovered that polymers are formed by heating beta,gamma-monoolefinic monohydric primary alcohols such as allyl alcohol or methallyl alcohol (beta-methylallyl alcohol) which are also devoid of a conjugated system in the presence of molecular oxygen or a peroxide compound with little damage or oxidation to the carbinol group thereof. Our discovery was also remarkable because of the opinions and findings of other workers in the field of art to which the invention relates. Thus Staudinger and Fleitmann in Ann. 480, 92–108 (1930) pointed out that they could not obtain a polymer from allyl alcohol, while Neher in U. S. Patent No. 2,254,382 states that methallyl alcohol does not polymerize at all.

According to the process of our invention, the olefinic alcohol as sole polymerizable compound is heated in intimate admixture with a polymerization catalyst containing an oxygen atom linked directly by a chemical bond to another oxygen atom, this catalyst being the sole catalytic agent present in the reaction mixture. By employing such a polymerization catalyst, as the sole catalytic agent in the reaction mixture, we have found that a polymer of novel structure and very useful properties is formed by what will be termed an oxy polymerization reaction. Our method thus distinguishes from the method of treatment of allyl alcohol used by Milas and his co-workers. These investigators describe in J. A. C. S. 58, 1302–1304 (1936) and 59, 543–544 (1937) the treatment of allyl alcohol with hydrogen peroxide in the presence of or combination with osmium tetroxide or ultraviolet light, whereby hydroxylation of the allyl alcohol to glycerol is effected. Quite unexpectedly, we found that by heating allyl alcohol in the presence of hydrogen peroxide as the sole catalytic agent present in the mixture, there was produced a polymer of the olefinic alcohol rather than glycerol.

The compounds which are polymerized according to the process of the invention are beta,-gamma-monoolefinic monohydric aliphatic primary alcohols having the gamma carbon atom thereof as the carbon atom of a terminal methylene group. These olefinic alcohols have the single hydroxyl group directly linked to the saturated alpha carbon atom with the lone olefinic double bond between the carbon atoms in the beta and gamma positions thereto. We have found it necessary to employ an olefinic alcohol containing a terminal methylene group in order to effect polymerization by our method. Preferably these olefinic primary alcohols are liquid at 25° C. and most preferably they contain up to four carbon atoms—i. e., have only three carbon atoms in the carbon chain of the molecule. They include allyl alcohol, methyllal alcohol, ethallyl alcohol (beta-ethyl allyl alcohol) and like higher beta-alkyl allyl alcohols.

The polymer formed in the process of the invention will be termed an oxy polymer of the olefinic alcohol utilized. The product is so termed because it contains a greater percentage of oxygen than the percentage of oxygen present in the monomeric alcohol, or the true addition polymer thereof. While the oxy polymers have most of the units of the olefinic alcohol bound together by carbon-to-carbon linkages like in true addition polymers, they also contain a unique and unexpected chemical structure in that some units of the olefinic alcohol in the oxy polymer molecule are joined by an ethereal oxygen atom and this ethereal oxygen accounts in part for the extra percentage of oxygen in the product. It was unexpected to discover that upon heating allyl or methallyl alcohol in intimate admixture with molecular oxygen or peroxide compounds that a product of such different chemical structure was obtained since like treatment upon other polymerizable compounds or even such a closely related compound as allyl acetate, produces the true addition polymer thereof, polyallyl acetate. The unique structure of the oxy polymer appears to be due to the special nature of the beta,gamma-olefinic alcohols treated and to use of one of them as sole polymerizable constituent in the reaction mixture.

The oxy polymer produced by the process of the invention is essentially a polyhydric alcohol in that the reactive functional groups therein are predominantly hydroxyl groups. However, the oxy polymer also contains a minor proportion of ester groups along with a very small proportion of carboxylic acid groups, aldehyde groups, and/or acetal groups. The presence and proportion of these other functional groups than hydroxyl groups will vary to some extent with the conditions employed in the process of the invention. Nevertheless, all of the oxygen present in the oxy polymer is not accounted for by that in the hydroxyl groups and these other functional groups because the remainder is contained as ethereal oxygen atoms which link together the monomeric units. Although the bonding of the monomeric units in the oxy polymer is predominantly by direct carbon-to-carbon chemical linkages, an appreciable proportion of the bonding is unique in being by means of an ethereal oxygen atom which separate the monomeric units. Consequently, the oxy polymer of the invention is not a true polymer of the olefinic alcohol. For example, polymerized allyl alcohol known as polyallyl alcohol contains the same percentage of oxygen as monomeric alcohol. In contrast, the oxy polymer of allyl or methallyl alcohol contains from 0.8 to about 6 per cent more oxygen than the percentage of oxygen contained in the monomeric olefinic alcohol from which the oxy polymer is derived.

The extra percentage of oxygen contained in the oxy polymer of the invention is supplied by or derived from the catalyst employed in the process. The catalyst thus performs two roles in the process. The major function is strictly catalytic in that it effects polymerization of the olefinic alcohol by causing monomer of the alcohol to couple by carbon-to-carbon linkages into polymer molecules in like manner, for example, that vinyl chloride couples together and polymerizes to polyvinyl chloride. The other function of the catalyst is in supplying the extra oxygen contained in the polymer as ethereal oxygen atoms which link together monomer units and the oxygen which oxidizes to slight extent the olefinic alcohol and/or its polymer. The extent of the oxidized units and ethereal oxygen linkages present in the oxy polymer of the invention varies somewhat and is dependent upon the particular olefinic alcohol treated, the particular polymerization catalyst employed, the temperature of operation of the process and the like.

The presence of a plurality of primary hydroxyl groups in the molecule of the oxy polymer makes it a particularly useful product. Although the oxy polymer does not contain the theoretical number of hydroxyl groups that would be present in the true addition polymer of the olefinic alcohol—i. e., one hydroxyl group for each monomer unit in the polymer molecule, because of the presence of a small proportion of more oxidized groups like ester groups, etc., the oxy polymer does contain about 50 to 90 per cent of the theoretical hydroxyl groups. The oxy polymer has a degree of polymerization of about 5 and upwards to 10, 15 or 20 depending upon the conditions of polymerization. With this number of monomer units combined or joined in the polymer molecule and with the hydroxyl groups predominating as the reactive functional group therein, the oxy polymers of the invention are particularly suited for a variety of industrial applications. The products are useful in glues, sizing materials for textiles or fabrics, and as grease-proofing impregnating agents for paper and the like. Their usefulness as chemical intermediates is extensive. They may be reacted with polycarboxylic acids such as maleic acid, phthalic acid, etc., to form alkyd resins, with unsaturated acids of the drying oil type to form new drying oils, with carboxylic acids to form esters, with nitric acid to form nitrate explosive products, etc. All of the hydroxyl groups in the oxy polymer are primary hydroxyl groups which is conducive for highest reactivity in a polyhydric alcohol. Polyvinyl alcohol, for example, has much lower reactivity because the functional groups therein are all secondary hydroxyl groups. Moreover, since the olefinic alcohol is used as sole polymerizable compound in the polymerization process of the invention, the oxy polymer obtained thereby is fusible and linear in character.

The process of the invention is executed by heating the olefinic alcohol in the presence of the polymerization catalyst consisting of a compound containing an oxygen atom linked directly to another oxygen atom, the compound being no more acidic than formic acid. A variety of substances are suitable for catalyzing the reaction including benzoyl peroxide, hydrogen peroxide, barium peroxide, sodium peroxide, the alkali metal perborates and persulfates, tetralin peroxide, olefin peroxide, acetyl peroxide, acetone peroxide and the like. Of these compounds benzoyl peroxide and hydrogen peroxide are preferred catalysts. The catalysts are used in amounts ranging from about 0.5 to 5.0 per cent of the alcohol being treated. If desired, of course, smaller or larger amounts of catalyst may be utilized. As the reaction proceeds, the catalyst may be consumed to a greater or lesser extent, and this may be obviated by addition of fresh catalyst to the reaction mixture to replace that which is destroyed or consumed. A particularly preferred catalyst for use in the process is a gas containing molecular oxygen. Molecular oxygen may be used in a substantially pure form or may contain various diluent gases such as nitrogen, carbon dioxide, argon or other inert gases. Preferably the gas contains at least 10 per cent of molecular oxygen. Air is ordinarily well suited for effecting the desired polymerization. It is preferred that the compound employed as catalyst have an appreciable solubility in the olefinic alcohol subjected to polymerization—i. e., that the compound be at least as soluble at 25° C. as the oxygen of air in the olefinic alcohol under a total pressure of one atmosphere.

In some instances, it is desirable to effect the oxy polymerization in the presence of two or more of the oxygenated polymerization catalysts. For example, hydrogen peroxide may be used in conjunction with air as the catalyst. Thus the process may be effected in the presence of one or more compounds containing an oxygen atom linked directly to another oxygen atom as polymerization catalyst, but no other catalytic agents are present in the reaction mixture like osmium tetroxide which would cause hydroxylation rather than the desired polymerization of the olefinic alcohol.

The temperature of operation of the process will to some extent govern the character of the products. A temperature of from about 50° C. to 200° C. is suitable. However, a temperature of operation of from about 50° C. to 100° C. constitutes a more preferred range although when air or substantially pure oxygen is employed as catalyst, a temperature of 85° C. or higher, such as up to about 140° C., is very suitable for producing an oxy polymer containing 5 or more hydroxyl groups in the molecule. The desired reactions are effected in the liquid phase and it is therefore desirable that the pressure upon the reaction mixture be sufficient to maintain at least a portion of the reaction mixture in the liquid phase at the temperature of operation. In some cases with epecially the higher olefinic alcohols, it may be desirable to employ liquid inert diluents in the reaction mixture such as benzene, toluene, hexane, heptane, octane and the like. Water may also be used, especially where it is desired to bring some water soluble catalysts into homogeneous mixture with a lower olefinic alcohol.

When an oxygen-containing gas is employed as catalyst, it is desirable that the gas be brought into intimate contact and admixture with the alcohol. This may be done in conventional manner such as injecting the gas from multiple jets at the base of an elongated chamber containing the alcohol whereby the gas in the form of fine bubbles is made to pass through substantially the entire length of the alcohol contained in the chamber.

The polymerization treatment of the olefinic alcohol is ordinarily not continued until all of the alcohol is in polymeric form, since the reaction mixture becomes too viscous for efficient agitation, which agitation is desirable in executing the process. The treatment may conveniently be followed by observation of the increase in refractive index—polymeric substances invariably have a higher refractive index than the monomer from which they are derived. Furthermore, the increase in refractive index of the polymerizing olefinic alcohol varies in approximate linear relationship to the proportion of oxy polymer present in the mixture at any moment during the polymerization. This relationship affords a ready method for determining the extent of polymerization at any time. By experimentally polymerizing the olefinic alcohol under desired conditions for several lengths of time with observation of the proportion of polymer formation, which polymer may be recovered by evaporation of monomer therefrom, the increase of refractive index which occurred in then correlated linearly with the proportion of polymer formation. The extent of polymer formation is readily ascertainable during subsequent polymerization of the olefinic alcohol under the same polymerizing conditions from determination of the refractive index at any time. Another method for reaching the same result is to measure the refractive index of the oxy polymer which is freed of monomer and linearly correlate this value as 100 per cent polymer with the refractive index of the monomer which is 0 per cent polymer.

The oxy polymer may be recovered by well known methods. A convenient means is to subject the reaction mixture to evaporation or distillation in vacuo whereby unreacted monomer may be recovered for reuse in the process. However, it is ordinarily undesirable to subject the reaction mixture to high temperatures for long periods of time owing to the detrimental effect of high temperatures upon the polymer. Flash evaporation in a continuous manner at as low a pressure as practicable is a particularly useful mode of operation.

The polymeric product obtained is not composed of a single molecular species; it consists of a mixture of high-molecular weight compounds. In the case of the product obtained by the oxy polymerization of allyl alcohol, the product is usually separable into a portion which is soluble in water and a portion which is insoluble in water. The crude product after removal of monomer therefrom may be separated into a water-soluble fraction by mixing the crude polymer with water, separating the two phases which will form, and removing the water from the aqueous extract by distillation or evaporation in vacuo.

The following examples are given for the purpose of illustrating the invention in detail, it being understood that the particular operative procedures given therein are not necessarily to be construed as limitative of the invention.

Example I

Three samples of methallyl alcohol were heated at 50° C. for 15 days. Two of the samples contained polymerization catalysts as noted below. Evidence that polymerization occurred is shown by an increase in refractive index of the samples. The following tabulation shows the results obtained:

| Catalyst | Refractive Index, $n_D^{20}$ | | Increase in Refractive Index |
|---|---|---|---|
| | Initial | After 15 days | |
| None | 1.4256 | 1.4259 | 0.0003 |
| 2% Hydrogen Peroxide | 1.4250 | 1.4264 | 0.0014 |
| 2% Benzoyl Peroxide | 1.4323 | 1.4349 | 0.0026 |

The refractive index of the formed oxy polymer of methallyl alcohol is 1.489 (see Example II). Consequently, the polymerization using hydrogen peroxide as the polymerization catalyst formed about 2.2 per cent polymer while that employing benzoyl peroxide produced about 4.1 per cent polymer.

Example II

A mixture of about 310 gms. of methallyl alcohol and 20 cc. of a 30 per cent aqueous solution of hydrogen peroxide was heated at 100° C. for 148 hours. During the heating period, ten additions of 20 cc. each of hydrogen peroxide solution and one addition of 15 cc. were made. Phase separation of the reaction mixture took place after the third day of heating. At the end of the heating period, the viscous lower layer, which apparently contained the reaction product, was separated and heated at 100° C. and 1 mm. pressure to remove volatile matter. The residue was a very viscous, yellow mass, soluble in acetone, methanol and benzene, and slightly soluble in water. Its weight was 124 gms. and its refractive index was 1.489. Analysis of the oxy polymer gave the following results: C=66.4%, H=10.5%; calculated C=68.7%, H=11.1%. A determination of molecular weight in benzene gave a value of 365, indicating the polymer molecules contained, on the average, five monomer units.

Example III

For polymerizing methallyl alcohol, the oxygen of air was used as the polymerization catalyst containing an oxygen atom linked directly to another oxygen atom. A one-liter bomb was charged with methallyl alcohol and about 7.2 cu. ft. of air was bubbled therethrough during four hours at a temperature of about 125°

C. and 260 lbs. per sq. in. guage. About 17 per cent of the alcohol was converted to oxy polymer which after evaporation of the monomeric methallyl alcohol therefrom, was an extremely viscous, yellow colored polymer which analyzed as follows:

Hydroxyl value, equiv. per 100 gms_____ 0.82
Ester value, equiv. per 100 gms_____ 0.14
Acid value, equiv. per 100 gms_____ 0.02
Aldehyde value, equiv. per 100 gms_____ 0.13
Iodine No., gms. I per 100 gms_____ 91

Example IV

About 155 gms. of allyl alcohol were heated at about 100° C. under reflux condenser in the presence of 2 per cent hydrogen peroxide. Hydrogen peroxide consumed was replenished at frequent intervals. After a time of 116 hours, the unreacted monomer was distilled from the reaction mixture in vacuo and about 134 gms. of light amber, extremely viscous liquid, having a refractive index of $n_D^{20}=1.5143$, were obtained. The molecular weight of the oxy polymer measured cryoscopically in acetic acid was found to be about 280, indicating a degree of polymerization of about 5.

Example V

Allyl alcohol was treated in a manner similar to that described in Example IV, except that about 2 per cent benzoyl peroxide was used instead of the hydrogen peroxide. After a heating time of 136 hours, a slightly yellow polymer of syrupy consistency was formed and separated. The refractive index of this material was 1.5380.

Example VI

A mixture of about 100 gms. of allyl alcohol and 111 gms. of potassium persulfate dissolved in 100 gms. of water was heated at 90° C. for 23 hours. The polymerizing treatment caused the refractive index (20/D) to increase 0.0068 unit, which increase, indicative of polymer formation, was small due to the diluting affect of the considerable proportion of water in the polymerization mixture.

Example VII

Example VI was repeated except that about 9.1 gms. of ammonium sulfate was used as catalyst in place of the potassium persulfate. The increase in refractive index amounted to 0.0047 unit.

Example VIII

About 77.5 gms. of allyl alcohol were heated at 90° C. with 8.5 gms. of barium peroxide for 22 hours. This treatment caused the refractive index (20/D) to increase about 0.0010 unit which indicated a conversion to oxy polymer of about 0.9 per cent.

Example IX

A mixture of about 310 gms. of allyl alcohol and 20 cc. of an aqueous solution containing 30 per cent hydrogen peroxide was heated at about 100° C. for 148 hours. During this time, eleven additions of 20 cc. each of hydrogen peroxide were made. The reaction product was then heated at 100° C. and 1 mm. pressure in order to remove water and other volatile matter. The residue, amounting to 297 gms., was the oxy polymer of allyl alcohol. The polymer was a very viscous, yellow mass having a refractive index of $n_D^{20}=1.512$ and was obtained in a yield of 97 per cent based on the allyl alcohol. An analysis of the polymer gave the following results:

| | Polymer | Theoretical for Allyl alcohol |
|---|---|---|
| Carbon, per cent | 57.6 | 62.1 |
| Hydrogen, per cent | 9.4 | 10.3 |
| Oxygen, per cent by dif. | 33.0 | 27.6 |
| Acidity, equiv. per 100 gms | 0.025 | |
| Acetyl Value, equiv. per 100 gms | 1.464 | |
| Ester Value, equiv. per 100 gms | 0.15 | |
| Acetal Value, equiv. per 100 gms | 0.0 | |

The above analytical results indicate that the polymer molecules contained predominantly units of allyl alcohol with the hydroxyl groups thereof unchanged, but that there was also present a minor proportion of ester groups and a very small quantity of carboxylic acid groups. However, the extra percentage of oxygen present in the oxy polymer was not all accounted for by these more highly oxidized groups because it was present as ethereal oxygen atoms. While the predominant linkage of monomer units in the polymer chain was by carbon-to-carbon bonding, a minor proportion of units were joined by means of ethereal oxygen atoms. The polymer had a degree of polymerization of about 5 and the amount of ethereal oxygen indicated the presence of about one ethereal oxygen atom in each polymer molecule.

Example X

Purified air was blown on a fine dispersion at a rate of about 0.13 cubic foot per hour through about 883 gms. of carefully purified allyl alcohol maintained at a temperature of 80° C. for approximately 172 hours. The volatile products were removed from the reaction product by evaporation in vacuo while passing a very slow stream of nitrogen therethrough. In this manner there was obtained about 440 gms. of crude oxy polymer. The crude polymer was then stirred with about four times its weight of water at 80° C. and allowed to separate into two phases. The aqueous phase was concentrated in vacuo at 25° C. followed by flash evaporation at 80° C. The water soluble polymer amounted to 274 gms. while the water insoluble portion weighed 122 gms.

Example XI

About 597 gms. of allyl alcohol was charged to a nickel-lined bomb fitted with a reflux condenser. With the contents at about 125° C., about 6.6 cu. ft. of air measured at atmospheric pressure was bubbled through the alcohol during a four hour period using a pressure of about 270 lbs. per sq. in. As a result of the polymerization, the refractive index (20/D) increased from 1.4120 to 1.4308. The contents of the bomb which weighed 601 gms. were subjected to distillation in vacuo to a temperature of about 135° C. and the oxy polymer recovered thereby showed the conversion to be about 20 per cent. The molecular weight of the oxy polymer was 617 indicating it had a degree of polymerization of about 10.6. The iodine number in gms. I per 100 gms. was 78 while other results, measured in equiv. per 100 gms., were as follows: acetyl value 0.84, ester value 0.16, and acid value 0.03. Analysis of the product gave the following results: $C=61.8\%$, $H=9.0\%$ and $O=29.2\%$.

This application is a continuation-in-part of our copending application, Serial No. 420,388, filed November 25, 1941, now abandoned.

We claim as our invention:

1. A process for the production of an oxy polymer of a beta,gamma-monoolefinic monohydric primary alcohol of up to four carbon atoms which has the gamma carbon atom thereof as the carbon atom of a terminal methylene group which comprises heating said alcohol as sole polymerizable compound at 50° C. to 200° C. in liquid phase in intimate admixture with hydrogen peroxide as sole catalytic agent added to the reaction mixture.

2. A process for the production of an oxy polymer of methallyl alcohol which comprises heating liquid methallyl alcohol as sole polymerizable compound at 50° C. in intimate admixture with hydrogen peroxide as sole catalytic agent added to the reaction mixture.

HANS DANNENBERG.
DAVID E. ADELSON.

REFERENCES CITED

The following references are of record in the file of this patent:

UNITED STATES PATENTS

| Number | Name | Date |
|---|---|---|
| 2,072,016 | Tamele | Feb. 23, 1937 |
| 2,316,604 | Loder | Apr. 13, 1943 |
| 2,332,460 | Muskat | Oct. 19, 1943 |
| 2,401,959 | Pfann | June 11, 1946 |

OTHER REFERENCES

Blicke: J. Am. Chem. Soc., 45, 1562–1566 (June 1923).